Jan. 18, 1938.  H. BENDER  2,105,581
MANUFACTURE OF NITROMETHANE
Filed Oct. 23, 1935
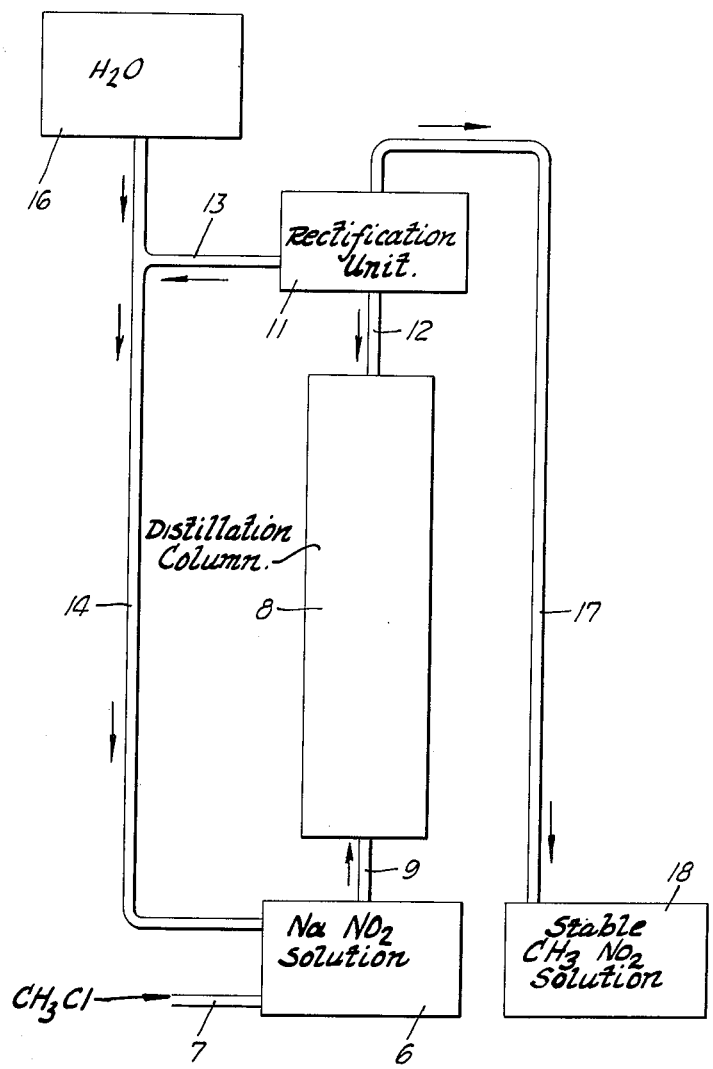
INVENTOR.
Harry Bender
BY Robert N. Eckhoff
ATTORNEY.

Patented Jan. 18, 1938

2,105,581

UNITED STATES PATENT OFFICE

2,105,581

MANUFACTURE OF NITROMETHANE

Harry Bender, Antioch, Calif., assignor to Great Western Electro-Chemical Company, a corporation of California Application October 23, 1935, Serial No. 46,270

13 Claims. (Cl. 260—144)

This invention relates to the manufacture of nitrated organic compounds, particularly nitromethane.

In Patent 1,996,388 of April 2, 1935 Ramage has disclosed an excellent process for the manufacture of chlorpicrin by chlorinating nitromethane under certain conditions. The present process provides a simple and a direct way of producing nitromethane.

Ellis in his book, "The Chemical Derivatives of Petroleum", has developed that of all organic compounds alkyl compounds having less than six carbon atoms are the most difficult to nitrate. As a matter of fact, there appears to be some question as to whether or not these materials have ever in fact been nitrated. At least, it can be fairly said that a nitration process has never been provided for these alkyl compounds which can be operated on a commercial basis. I have discovered a process for the nitration of such compounds and particularly a process for producing nitromethane. The invention is of course applicable to other compounds, particularly organic halides wherein the halide can be replaced by an $NO_2$ group.

It is an object of the present invention to provide a process for the economical manufacture of nitromethane.

Another object of the present invention is to provide a nitration process for alkyl compounds containing less than six carbon atoms.

A further object of the present invention is to provide a nitration process for organic material.

The invention includes other objects and features of advantage, some of which, together with the foregoing will appear hereinafter, wherein the present preferred manner of carrying out the process of this invention has been set forth.

The drawing accompanying and forming a part of the specification sets forth diagrammatically a suitable apparatus for carrying out the process of this invention.

Briefly stated, the present invention can be said to comprise a discovery that a nitrite will react with an organic halide, the nitrite group being substituted for the halide group. For example, sodium nitrite reacts with methyl chloride to give nitromethane and sodium chloride. This reaction can be written as follows:—

$$NaNO_2 + CH_3Cl \rightarrow CH_3NO_2 + NaCl$$

This reaction is not an equilibrium reaction and in fact is only a representation of the net result secured when these compounds are brought together. I have determined that reactions much more complex than this go on and that the above reaction is only one summarizing the net effects of several reactions.

I have further discovered that the solution should be regulated as to its pH value. Thus while sodium nitrite solution has a pH of 9.1, upon introduction of methyl chloride the pH drops to 6. If the pH gets above 10 methazonic acid is formed.

In practice, I have made up the sodium nitrite solution and placed it in a vessel 6. The concentration of this solution does not appear to be material and I have used solutions ranging from 1 mol. to 10 mols. The vessel 6 is heated at the boiling point of the sodium nitrite solution while the methyl chloride is introduced at the bottom of the vessel through line 7. The vessel contains suitable mixing means securing intimate contact between the gas and the solution. A distillation column 8 is connected by line 9 to the vessel 6 and the nitromethane formed distills off through this column. A fractionating section 11 is connected by a line 12 to the tower 8 and part of the reflux in said column is returned through line 13 and line 14 to vessel 6. Line 14 is used to supply water from tank 16. A supply of water during the course of the reaction is desirable since nitromethane forms a constant boiling mixture at about 82° C. with water. In effect, therefore, the nitromethane is removed by steam distillation and it is therefore desirable to supply plenty of steam during the course of the reaction. Return of a portion of the reflux through lines 13 and 14 is desirable because it enables a higher concentration of the nitrite to be maintained in the column 8.

I have found that the apparatus works best when good contact is being secured between the methyl chloride and the sodium nitrite solution. The reaction is apparently one that goes on at the interface between a gas and liquid and I therefore preferably add a foaming agent to the vessel 6. Any suitable foaming agent can be used such as a soap. I have used the product known as Dupanol successfully. These result in the column 8 being full of liquor so that excellent contact is secured.

As a foaming agent I prefer to use an oleate such as sodium or potassium oleate since this material not only acts as an excellent foaming agent but as a pH stabilizer as well. Of course, when foaming agents forming insoluble soaps with the alkali earths are employed, it is advisable not to use the nitrites of these earths.

I have found it desirable to remove the nitromethane continually as it is formed. If any considerable concentration of nitromethane is allowed to build up, I have found that the reaction ceases. In fact, the concentration of nitromethane present does not have to be very large to slow down the reaction to a very material rate and to even make the reaction cease.

The pH of the mixture in vessel 6 is kept between certain values to secure maximum yield. These values are 6 and 10 when the pH is measured by taking a sample, cooling to about 20° C. and then measuring. Measured hot the pH will be about 5 to 9, depending on the temperature. The variance of pH with temperature is of course recognized scientifically.

The correct maintenance of the pH is secured by the use of a suitable buffer in tank 6. I have used $CaCO_3$ successfully but any other material which will maintain the pH can be used—sodium carbonate, sodium bicarbonate, sodium borate are merely mentioned as a few. If the material is soluble it can be added with the water passed through line 14 from tank 16 or in suspension therein.

The invention is applicable to the nitrite of any alkali metal, including sodium potassium and ammonia as well as to the alkaline earth materials. For practical commercial purposes however, sodium nitrite is the least expensive and acts suitably.

It is desirable that carbon dioxide be kept out of the reaction since this reacts with nitrous acid and provides undesirable by-products.

The maintenance of the pH conditions mentioned I have found desirable inasmuch as if pH's exist which are below or above the value specified, then the reaction does not go as smoothly. The reaction forms methyl nitrite as well as nitromethane. Under the pH conditions specified, this hydrolyzes to methyl alcohol and nitrous acid and I have found 10% of methyl alcohol in the nitromethane solution. The last mentioned material gives nitrite again if the pH conditions mentioned as desirable are observed. It is best to keep the temperature low for at higher temperatures methyl alcohol is formed in quantity.

The nitromethane is removed in a concentrated water solution through line 17 to tank 18. This solution should be maintained between a pH of 4 and 8 to ensure stability of the nitromethane. The nitromethane can be reacted with a suitable chlorinating agent to form a chlorpicrin.

The nitromethane solution is removed, the nitromethane content varying from 10% up to a constant boiling mix containing nearly 75%. The production of very concentrated solutions can be conducted but in any case the solution should be maintained between pH4 and pH8 to ensure its stability. This can be done by the use of suitable buffers as those mentioned.

The invention is of course applicable to the nitration of other saturated aliphatic compounds including the halides of ethane, propane, pentane and butane. In fact, the invention is applicable to the nitration of any organic compound containing a halide group replaceable by the $NO_2$ group.

I claim:

1. A process for the manufacture of nitromethane comprising reacting a methyl monohalide and a nitrite from the group consisting of alkali metal nitrite, alkaline earth metal nitrite and ammonium nitrite while maintaining a pH between 6 and 10.

2. A process for the manufacture of nitromethane comprising reacting a methyl monohalide and a nitrite from the group consisting of alkali metal nitrite, alkaline earth metal nitrite and ammonium nitrite and removing nitromethane substantially as it forms while maintaining a pH between 6 and 10.

3. A process for the manufacture of nitromethane comprising reacting a methyl monohalide and a nitrite from the group consisting of alkali metal nitrite, alkaline earth metal nitrite and ammonium nitrite in the presence of a foaming agent while maintaining a pH between 6 and 10

4. The process as in claim 3 where sodium oleate is used as a frother and a pH stabilizer.

5. A process for the manufacture of nitromethane comprising reacting methyl chloride and an alkali metal nitrite at a pH between substantially 6 and 10.

6. A process for the manufacture of nitromethane comprising reacting methyl chloride and an alkali metal nitrite and removing nitromethane as it forms at a pH between substantially 6 and 10.

7. A process for the manufacture of nitromethane comprising reacting methyl chloride and an alkali metal nitrite at a pH between substantially 6 and 10 and removing nitromethane as it forms.

8. A process for producing nitromethane comprising boiling a methyl monohalide and a solution of a nitrite from the group consisting of alkali metal nitrite, alkaline earth metal nitrite and ammonium nitrite to distill off a mixture including metal nitrite, said halide and nitromethane, fractionating said mixture to separate out nitromethane as a recoverable fraction and returning a reflex stream directly to the boiling metal nitrite solution.

9. A process for producing nitromethane comprising boiling a methyl monohalide and a solution of a nitrite from the group consisting of alkali metal nitrite, alkaline earth metal nitrite and ammonium nitrite having a pH of between 6 and 10 to distill off a mixture including nitrite, said halide and nitromethane, fractionating said mixture to separate out nitromethane as a recoverable fraction and returning a reflux stream directly to the boiling nitrite solution.

10. A process for producing nitromethane comprising boiling a methyl monohalide and a solution of a nitrite from the group consisting of alkali metal nitrite, alkaline earth metal nitrite and ammonium nitrite having a pH of between 6 and 10 to distill off a mixture including nitrite, said halide and nitromethane, fractionating said mixture to separate out nitromethane as a recoverable fraction in an aqueous solution, and maintaining the pH of said separated solution at between 4 and 8.

11. A process for the manufacture of nitromethane comprising reacting a methyl monohalide and a nitrite from the group consisting of alkali metal nitrite, alkaline earth metal nitrite and ammonium nitrite in aqueous solution while maintaining a pH between 6 and 10 to produce nitromethane in said solution, distilling a constant boiling mixture of nitromethane with water to separate nitromethane from said solution, maintaining said separated mixture at a pH between 4 and 8.

12. A process for the manufacture of nitromethane comprising reacting a methyl monohalide and an aqueous solution of a nitrite from the group consisting of alkali metal nitrite, alkaline earth metal nitrite and ammonium nitrite solution at a pH between 6 and 10 to produce nitromethane, separating nitromethane in aqueous solution from said monohalide and nitrite, and correcting the pH of said separated aqueous solution of nitromethane to between 4 and 8.

13. The steps in the process of manufacture of nitromethane which include distilling a substantially constant boiling mixture of nitromethane and water to separate nitromethane out of a reacting mass producing said nitromethane, and correcting the pH of said separated mixture to between 4 and 8.

HARRY BENDER.